(12) United States Patent
Kitagawa et al.

(10) Patent No.: US 12,046,258 B2
(45) Date of Patent: Jul. 23, 2024

(54) AUDIO SIGNAL PROCESSING DEVICE, AUDIO SIGNAL PROCESSING METHOD, AND RECORDING MEDIUM

(71) Applicant: Panasonic Intellectual Property Management Co., Ltd., Osaka (JP)

(72) Inventors: Hiroki Kitagawa, Osaka (JP); Masaaki Tomoda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 155 days.

(21) Appl. No.: 17/912,740

(22) PCT Filed: Jul. 8, 2021

(86) PCT No.: PCT/JP2021/025732
§ 371 (c)(1),
(2) Date: Sep. 19, 2022

(87) PCT Pub. No.: WO2022/030172
PCT Pub. Date: Feb. 10, 2022

(65) Prior Publication Data
US 2023/0144494 A1 May 11, 2023

(30) Foreign Application Priority Data
Aug. 5, 2020 (JP) ................................ 2020-133324

(51) Int. Cl.
*G11B 20/10* (2006.01)
(52) U.S. Cl.
CPC .............................. *G11B 20/10398* (2013.01)
(58) Field of Classification Search
CPC .................................................. G11B 20/10398
See application file for complete search history.

(56) References Cited

U.S. PATENT DOCUMENTS

| 4,306,113 A | 12/1981 | Morton |
| 2023/0144494 A1* | 5/2023 | Kitagawa ................. H04R 5/04 381/58 |

FOREIGN PATENT DOCUMENTS

JP 2010-226329 A 10/2010

OTHER PUBLICATIONS

International Search Report issued on Oct. 12, 2021 in International Patent Application No. PCT/JP2021/025732, with English translation.

* cited by examiner

*Primary Examiner* — Andrew L Sniezek
(74) *Attorney, Agent, or Firm* — Rimon P.C.

(57) ABSTRACT

An audio signal processing device includes a first input terminal which receives an audio signal from a record player, a memory which stores a correction parameter for audio signal processing and characteristic information indicating the characteristic of an audio signal for measurement, a signal processing circuit which performs the audio signal processing on the audio signal received based on the correction parameter, and a microcomputer. The microcomputer measures the sound characteristic of the audio signal received when the audio signal for measurement recorded on a phonograph record for measurement are reproduced, generates the correction parameter based on a result of comparison between the result of the measurement and the characteristic information, and stores, in the memory, setting information and the correction parameter generated, in association with each other, the setting information indicating a setting on the audio signal processing when the measurement is performed.

9 Claims, 5 Drawing Sheets

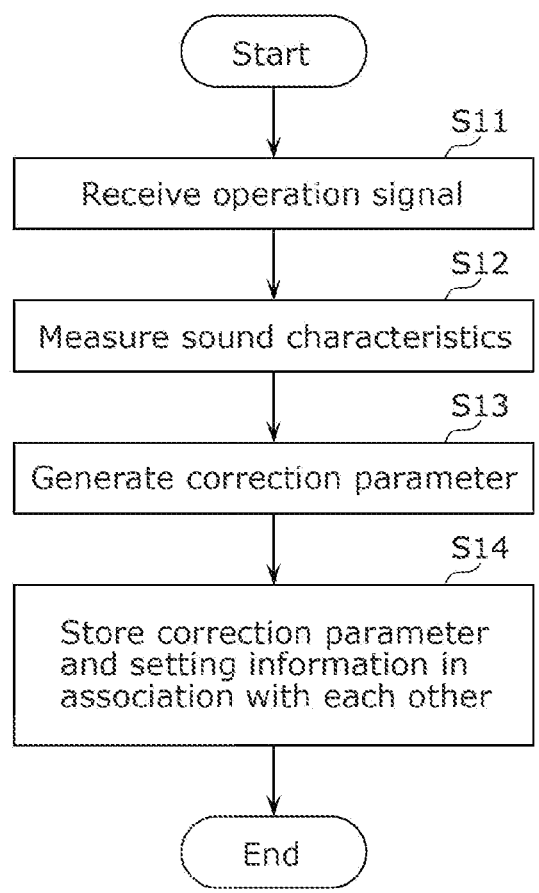

FIG. 4

| Setting identifier | Correction parameter | Setting information ||| 
|---|---|---|---|---|
| | | Gain | Selector information | Cartridge information |
| Sound setting 1 | Correction parameter 1 | Gain 1 | First input terminal | MM type |
| Sound setting 2 | Correction parameter 2 | Gain 1 | First input terminal | MC type |
| Sound setting 3 | Correction parameter 3 | Gain 1 | Second input terminal | MM type |
| Sound setting 4 | Correction parameter 4 | Gain 1 | Second input terminal | MC type |
| Sound setting 5 | Correction parameter 5 | Gain 2 | First input terminal | MM type |
| Sound setting 6 | Correction parameter 6 | Gain 2 | First input terminal | MC type |
| ⋮ | ⋮ | ⋮ |||

AUDIO SIGNAL PROCESSING DEVICE, AUDIO SIGNAL PROCESSING METHOD, AND RECORDING MEDIUM

CROSS-REFERENCE OF RELATED APPLICATIONS

This application is the U.S. National Phase under 35 U.S.C. § 371 of International Patent Application No. PCT/JP2021/025732, filed on Jul. 8, 2021, which in turn claims the benefit of Japanese Patent Application No. 2020-133324, filed on Aug. 5, 2020, the entire disclosures of which applications are incorporated by reference herein.

TECHNICAL FIELD

The present disclosure relates to audio signal processing devices, audio signal processing methods, and recording media.

BACKGROUND ART

Patent Literature (PTL) 1 discloses a portable terminal device which can perform audio output correction corresponding to earphones that are connected. The portable terminal device uses audio signals for test to measure the impedance of the earphones connected to earphone connection terminals, and performs low-frequency boost correction according to the resulting characteristics to individually correct, according to the characteristics of the earphones, the characteristics of the output sound thereof.

CITATION LIST

Patent Literature

[PTL 1] Japanese Unexamined Patent Application Publication No. 2010-226329

SUMMARY OF INVENTION

Technical Problem

In PTL 1, when the earphones are connected to the portable terminal device, the portable terminal device measures and records a correction parameter for the earphones to perform automatic switching. In a case where this technique is applied to a system having a function in which a user can change settings on audio signal processing to settings desired by the user, when the settings are changed after the measurement of the correction parameter, in order to realize sound quality with the settings desired by the user, it is necessary to reset the settings as in the measurement of the correction parameter. Hence, disadvantageously, the convenience of the user is significantly lowered.

The present disclosure provides an audio signal processing device which can perform, without impairing the convenience of a user, audio signal processing using a correction parameter obtained by performing a measurement with settings desired by the user and the like.

Solution to Problem

An audio signal processing device in the present disclosure is an audio signal processing device that performs audio signal processing on an audio signal reproduced in a record player, the audio signal processing device includes: a first input terminal that receives the audio signal from the record player; a memory that stores a correction parameter for the audio signal processing on the audio signal and characteristic information indicating a characteristic of an audio signal for measurement; a signal processing circuit that performs, based on the correction parameter stored in the memory, the audio signal processing on the audio signal received from the first input terminal; and a microcomputer, and the microcomputer measures, when the audio signal for measurement recorded on a phonograph record for measurement is reproduced by the record player, a sound characteristic of an audio signal received by the first input terminal from the record player, generates, based on a result of comparison between a result of the measurement performed by the microcomputer and the characteristic information stored in the memory, the correction parameter for the audio signal processing in the signal processing circuit, and stores, in the memory, setting information and the correction parameter generated, in association with each other, the setting information indicating a setting on the audio signal processing in the audio signal processing device when the measurement is performed.

An audio signal processing method in the present disclosure is an audio signal processing method performed in an audio signal processing device that performs audio signal processing on an audio signal reproduced in a record player, and the audio signal processing method includes: measuring, when an audio signal for measurement recorded on a phonograph record for measurement is reproduced by the record player, a sound characteristic of the audio signal received from the record player; generating, based on a result of comparison between a result of the measurement performed and characteristic information stored in a memory included in the audio signal processing device and indicating a characteristic of the audio signal for measurement, a correction parameter for the audio signal processing; and storing, in the memory, setting information and the correction parameter generated, in association with each other, the setting information indicating a setting on the audio signal processing in the audio signal processing device when the measurement is performed.

These general or specific aspects may be realized by a system, a method, an integrated circuit, a computer program, or a computer-readable recording medium such as a CD-ROM or may be realized by any combination of a system, a method, an integrated circuit, a computer program, and a recording medium.

Advantageous Effects of Invention

An audio signal processing device in the present disclosure can perform, without impairing the convenience of a user, audio signal processing using a correction parameter obtained by performing a measurement with settings desired by the user.

BRIEF DESCRIPTION OF DRAWINGS

FIG. 3 is a flowchart showing the operation of measurement processing performed by an audio signal processing device in the embodiment.

FIG. 4 is a diagram showing an example of a plurality of sound settings stored in a memory in the embodiment.

DESCRIPTION OF EMBODIMENTS

Figure 1:
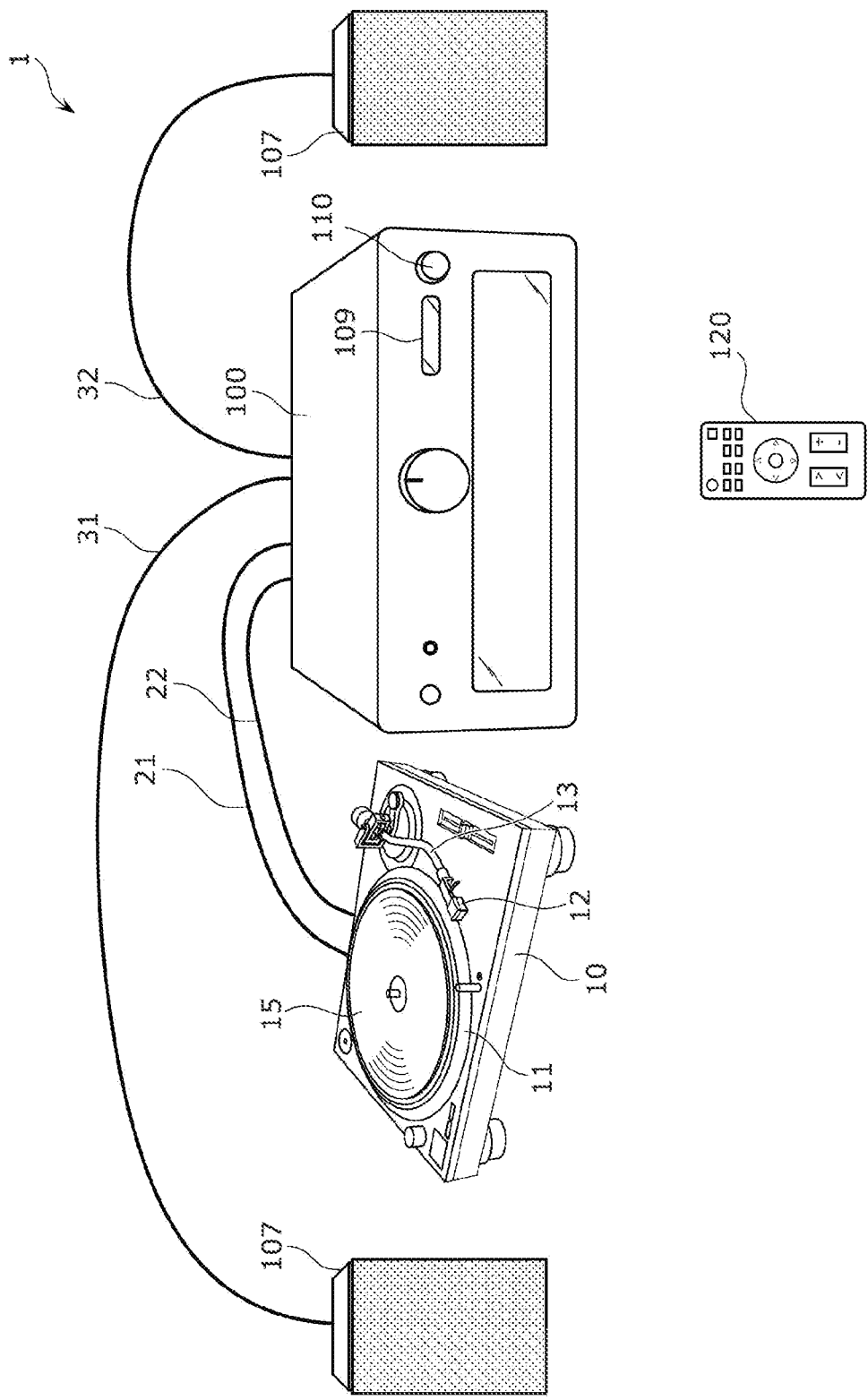
FIG. 1 is a schematic diagram showing the configuration of a record reproduction system in an embodiment.

An audio signal processing device according to an aspect of the present disclosure is an audio signal processing device that performs audio signal processing on an audio signal reproduced in a record player, the audio signal processing device includes: a first input terminal that receives the audio signal from the record player; a memory that stores a correction parameter for the audio signal processing on the audio signal and characteristic information indicating a characteristic of an audio signal for measurement; a signal processing circuit that performs, based on the correction parameter stored in the memory, the audio signal processing on the audio signal received from the first input terminal; and a microcomputer, and the microcomputer measures, when the audio signal for measurement recorded on a phonograph record for measurement is reproduced by the record player, a sound characteristic of an audio signal received by the first input terminal from the record player, generates, based on a result of comparison between a result of the measurement performed by the microcomputer and the characteristic information stored in the memory, the correction parameter for the audio signal processing in the signal processing circuit, and stores, in the memory, setting information and the correction parameter generated, in association with each other, the setting information indicating a setting on the audio signal processing in the audio signal processing device when the measurement is performed.

In this way, the audio signal processing device according to the present embodiment stores, in the memory, the setting information and the correction parameter generated, in association with each other, the setting information indicating the setting on the audio signal processing in the audio signal processing device when the measurement is performed. Hence, for example, when a user operates the audio signal processing device to select and set the correction parameter and the setting information stored in the memory in association with each other, the user can also automatically make the setting for the audio signal processing device based on the setting information in conjunction with the setting for the correction parameter. Therefore, it is possible to perform, without impairing the convenience of the user, the audio signal processing using the correction parameter obtained by performing the measurement with the setting desired by the user, with the result that desired sound quality can easily be realized.

Preferably, the microcomputer reads the correction parameter stored in the memory and the setting information stored in the memory in association with the correction parameter, controls the audio signal processing device with the setting indicated by the setting information read, and causes the signal processing circuit to perform the audio signal processing using the correction parameter read.

In this way, the audio signal processing device according to the present embodiment stores, in the memory, the setting information and the correction parameter generated, in association with each other, the setting information indicating the setting on the audio signal processing in the audio signal processing device when the measurement is performed. Then, when the audio signal processing device selects and sets the correction parameter and the setting information stored in the memory in association with each other, the audio signal processing device also automatically makes the setting for the audio signal processing device based on the setting information in conjunction with the setting for the correction parameter. Therefore, it is possible to perform, without impairing the convenience of the user, the audio signal processing using the correction parameter obtained by performing the measurement with the setting desired by the user, with the result that desired sound quality can easily be realized.

Preferably, the audio signal processing device further includes: a second input terminal that receives an input of the audio signal from the record player; and a selector that selects, from the first input terminal and the second input terminal, one input terminal for receiving the audio signal, the setting information includes selector information indicating the one input terminal selected by the selector when the measurement is performed, the microcomputer causes the selector to select the one input terminal indicated by the selector information included in the setting information read, and the signal processing circuit performs, on the audio signal received by the one input terminal selected by the selector, the audio signal processing using the correction parameter read together with the setting information.

Hence, when the input terminal selected by the selector is different from the input terminal indicated by the selector information included in the setting information read, the input terminal indicated by the selector information is caused to be selected by the selector. As described above, when the setting indicated by the setting information read is different from the current setting in the audio signal processing device, the setting is changed to the setting indicated by the setting information, and thus it is possible to also automatically make the setting for the audio signal processing device based on the setting information in conjunction with the setting for the correction parameter. Therefore, the convenience of the user is enhanced.

Preferably, the audio signal processing device further includes: a second input terminal that receives an input of the audio signal from the record player; a selector that selects, from the first input terminal and the second input terminal, one input terminal for receiving the audio signal; and a presenter that presents a message, the setting information includes selector information indicating the one input terminal selected by the selector when the measurement is performed, and the microcomputer causes, when the one input terminal indicated by the selector information included in the setting information read is different from an input terminal selected by the selector, the presenter to present a message indicating that an input terminal different from the one input terminal is selected by the selector.

Hence, it is possible to provide a notification to the user that the input terminal different from the one input terminal is selected by the selector.

Preferably, the message includes a message that prompts a user to provide an input for causing the selector to switch to the one input terminal.

Hence, it is possible to prompt the user to provide an input for causing the selector to switch to the one input terminal.

Preferably, the audio signal processing includes first amplification processing that is performed on an audio signal after analog-digital conversion, the setting information includes a first gain that is set for the first amplification processing, and the signal processing circuit performs the first amplification processing with the first gain included in the setting information read.

Hence, when the first gain set for the first amplification processing performed by the signal processing circuit is different from the first gain included in the setting information read, the gain for the first amplification processing is updated to the first gain included in the setting information read. As described above, when the setting indicated by the setting information read is different from the current setting in the audio signal processing device, the setting is changed to the setting indicated by the setting information, and thus it is possible to also automatically make the setting for the audio signal processing device based on the setting information in conjunction with the setting for the correction parameter. Therefore, the convenience of the user is enhanced.

Preferably, the audio signal processing device further includes: an amplification processing circuit that performs second amplification processing on the audio signal received by the first input terminal; and a receiver that receives an input from a user, the setting information includes cartridge information indicated by the input received by the receiver and indicating a type of cartridge included in the record player, and the microcomputer causes the amplification processing circuit to perform the second amplification processing with a second gain corresponding to the type of cartridge indicated by the cartridge information included in the setting information read.

Hence, when the type of cartridge set for the audio signal processing device is different from the type of cartridge indicated by the cartridge information included in the setting information read, the setting for the audio signal processing device is updated to the type of cartridge indicated by the cartridge information. In this way, the microcomputer updates, according to the updated setting, the second gain for the second amplification processing performed by the amplification processing circuit. As described above, when the setting indicated by the setting information read is different from the current setting in the audio signal processing device, the setting is changed to the setting indicated by the setting information, and thus it is possible to also automatically make the setting for audio signal processing device 100 based on the setting information in conjunction with the setting for the correction parameter. Therefore, the convenience of the user is enhanced.

An audio signal processing method in the present disclosure is an audio signal processing method performed in an audio signal processing device that performs audio signal processing on an audio signal reproduced in a record player, and the audio signal processing method includes: measuring, when an audio signal for measurement recorded on a phonograph record for measurement is reproduced by the record player, a sound characteristic of the audio signal received from the record player; generating, based on a result of comparison between a result of the measurement performed and characteristic information stored in a memory included in the audio signal processing device and indicating a characteristic of the audio signal for measurement, a correction parameter for the audio signal processing; and storing, in the memory, setting information and the correction parameter generated, in association with each other, the setting information indicating a setting on the audio signal processing in the audio signal processing device when the measurement is performed.

In this way, in the audio signal processing method according to the present embodiment, the setting information indicating the setting on the audio signal processing in the audio signal processing device when the measurement is performed is stored in the memory in association with the correction parameter generated. Hence, for example, when the user operates the audio signal processing device to select and set the correction parameter and the setting information stored in the memory in association with each other, the user can also automatically make the setting for the audio signal processing device based on the setting information in conjunction with the setting for the correction parameter. Therefore, it is possible to perform, without impairing the convenience of the user, the audio signal processing using the correction parameter obtained by performing the measurement with the setting desired by the user, with the result that desired sound quality can easily be realized.

These general or specific aspects may be realized by a system, a method, an integrated circuit, a computer program, or a computer-readable recording medium such as a CD-ROM or may be realized by any combination of a system, a method, an integrated circuit, a computer program, and a recording medium.

Embodiments will be described in detail below with reference to drawings as necessary. However, a detailed description beyond necessity may be omitted. For example, a detailed description of an already well known matter or a repeated description of substantially the same configuration may be omitted. This is intended to prevent the following description from being unnecessarily redundant and facilitate the understanding of a person skilled in the art.

The accompanying drawings and the following description are provided so that the person skilled in the art fully understands the present disclosure, and are not intended to limit the subject matter of the claims.

Embodiment

[1-1. Configuration]

Figure 2:
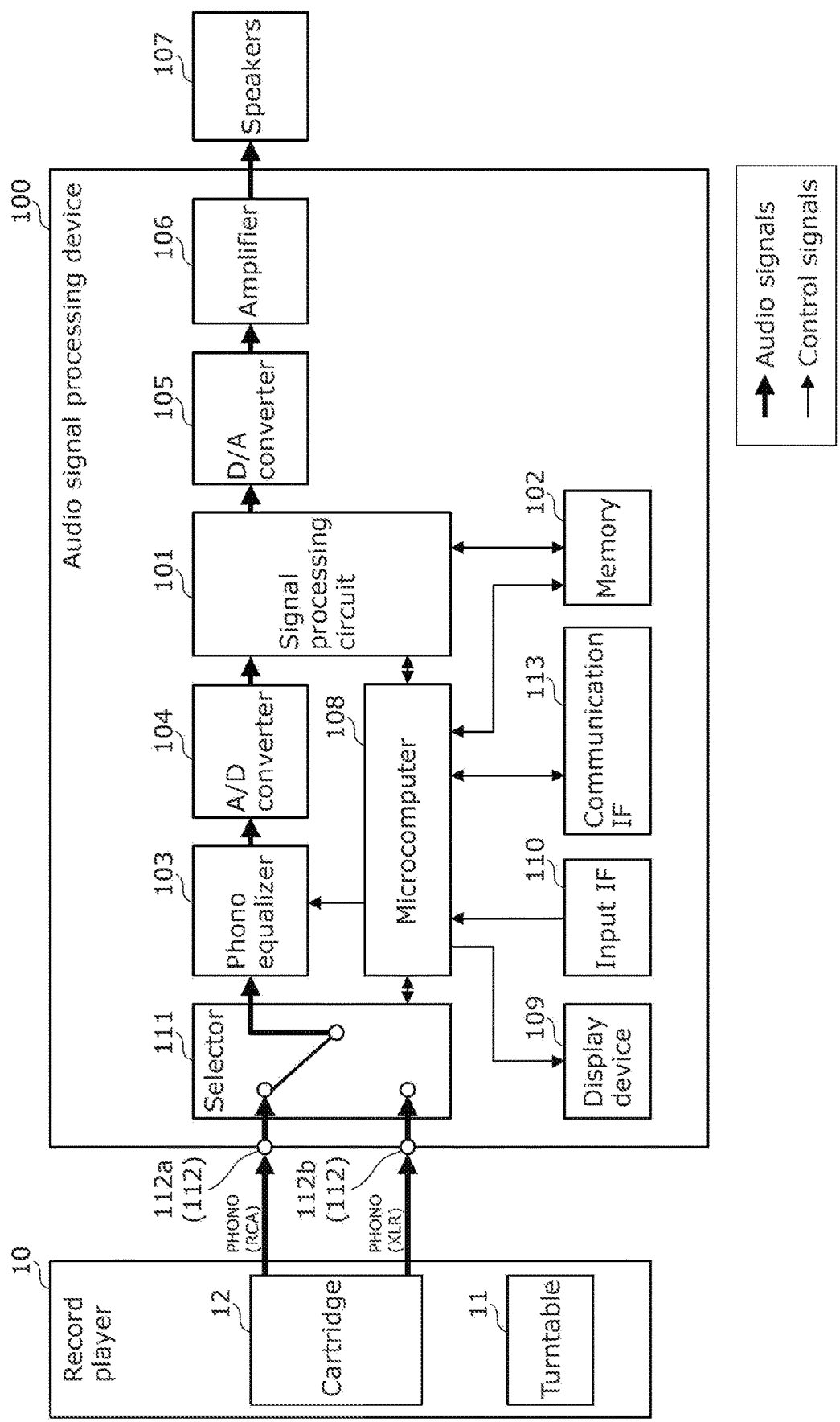
FIG. 2 is a block diagram showing the configuration of the record reproduction system in the embodiment.

FIG. 1 is a schematic diagram showing the configuration of a record reproduction system in an embodiment. FIG. 2 is a block diagram showing the configuration of the record reproduction system in the embodiment.

As shown in these figures, record reproduction system 1 is a system for reproducing an analog record (hereinafter referred to as phonograph record 15), and includes record player 10, audio signal processing device 100, and speakers 107. In FIG. 1, remote controller 120 is shown which transmits, to audio signal processing device 100, a control signal for indicating control in audio signal processing device 100.

Record player 10 is an audio device which reproduces signals (for example, audio signals) recorded on phonograph record 15, and includes turntable 11, cartridge 12, and tone arm 13.

Turntable 11 is a rotary stage on which phonograph record 15 is placed, and rotates (spins) at a constant speed in a predetermined rotation direction when phonograph record 15 is reproduced.

Cartridge 12 is a pickup cartridge which includes a phonograph needle. Cartridge 12 is interchangeably provided at a tip of tone arm 13. The phonograph needle of cartridge 12 traces the sound groove of phonograph record 15 placed on rotating turntable 11 when phonograph record 15 is reproduced. There are various types of cartridges 12 such as a moving magnet type (MM type) and a moving coil type (MC type) depending on the difference in the structure thereof. Cartridge 12 acquires, as vibrations, signals recorded on the sound groove of phonograph record 15 via the phonograph needle. Cartridge 12 uses a magnet or a coil included in cartridge 12 to convert the vibrations acquired via the phonograph needle into analog electrical signals, and outputs, as audio signals, the electrical signals obtained by the conversion. In cartridge 12, the sound characteristics and the signal levels of the audio signals obtained are different according to the type of cartridge 12. The sound characteristics in the present disclosure include a frequency characteristic and a phase characteristic.

Tone arm 13 holds cartridge 12 at the tip, appropriately controls a pressure applied between the phonograph needle of cartridge 12 and phonograph record 15 rotating on turntable 11, and performs control such that the phonograph needle smoothly traces the sound groove of rotating phonograph record 15.

Record player 10 can transmit, to audio signal processing device 100, the audio signals output by cartridge 12 using a plurality of transmission paths. In the present embodiment, record player 10 includes a first output terminal (not shown) to which first transmission cable 21 is connected and which outputs the audio signals and a second output terminal (not shown) to which second transmission cable 22 is connected and which outputs the audio signals. Hence, record player 10 can transmit the audio signals by the transmission paths of first transmission cable 21 and second transmission cable 22. First transmission cable 21 is, for example, an RCA cable. Second transmission cable 22 is, for example, an XLR cable. As long as transmission cables 21 and 22 are cables capable of transmitting the audio signals to audio signal processing device 100, they are not limited to the RCA cable and the XLR cable described as examples. For example, one of first transmission cable 21 and second transmission cable 22 may be another cable such as an AUX cable. First transmission cable 21 and second transmission cable 22 are different types of cables, and the transmission paths of transmission cables 21 and 22 differ from each other in sound characteristics. Hence, the audio signals which have passed through these transmission paths differ from each other in sound characteristics.

Audio signal processing device 100 is a device which performs audio signal processing on the audio signals reproduced in record player 10. Audio signal processing device 100 specifically performs adjustment processing on the sound characteristics of the audio signals from record player 10 and amplification processing on the audio signals. Audio signal processing device 100 outputs, to speakers 107, the audio signals on which the audio signal processing has been performed. Audio signal processing device 100 may be, for example, an amplification device. As shown in FIG. 2, audio signal processing device 100 includes signal processing circuit 101, memory 102, phono equalizer 103, A/D converter 104, D/A converter 105, amplifier 106, microcomputer 108, display device 109, input interface (IF) 110, selector 111, input terminal 112, and communication IF 113.

Input terminal 112 is a terminal which receives the audio signals from record player 10. Input terminal 112 includes first input terminal 112a and second input terminal 112b. First input terminal 112a is, for example, a terminal of PHONO (RCA), and first transmission cable 21 is connected to first input terminal 112a. Second input terminal 112b is, for example, a terminal of PHONO (XLR), and second transmission cable 22 is connected to second input terminal 112b. First input terminal 112a and second input terminal 112b are different types of terminals. First input terminal 112a is preferably a terminal corresponding to first transmission cable 21 and is not limited to the terminal of PHONO (RCA). Likewise, second input terminal 112b is preferably a terminal corresponding to second transmission cable 22 and is not limited to the terminal of PHONO (XLR). For example, one of first input terminal 112a and second input terminal 112b may be an AUX terminal.

Selector 111 selects one input terminal for receiving the audio signals from first input terminal 112a and second input terminal 112b. Selector 111 selects, by control of microcomputer 108, one of first input terminal 112a and second input terminal 112b, that is, one of the terminal of PHONO (RCA) and the terminal of PHONO (XLR), and outputs, to phono equalizer 103, the analog audio signals received by the selected terminal.

Phono equalizer 103 is an equalizer which preforms the amplification processing on the analog audio signals received from selector 111 and correction processing on the frequency amplitude characteristic of the audio signals. Specifically, phono equalizer 103 amplifies, with a set gain, the analog audio signals which are input. This gain is a gain for amplifying the analog audio signals obtained from record player 10 and is set by microcomputer 108. In order to reproduce original sound recorded on phonograph record 15, phono equalizer 103 performs correction (reverse correction) with characteristics reverse to correction which is performed when the original sound is recorded on the phonograph record. Phono equalizer 103 outputs, to A/D converter 104, the audio signals on which the amplification processing and the correction processing have been performed. Phono equalizer 103 is an example of an amplification processing circuit. The amplification processing performed by phono equalizer 103 is an example of second amplification processing. The gain used in the amplification processing performed by phono equalizer 103 is an example of a second gain.

A/D converter 104 is a converter which converts the analog audio signals received from phono equalizer 103 into digital audio signals. A/D converter 104 outputs the digital audio signals after the conversion to signal processing circuit 101.

Signal processing circuit 101 performs, by control of microcomputer 108, various types of audio signal processing on the digital audio signals received from A/D converter 104. The audio signal processing includes adjustment processing on the sound characteristics of the digital audio signals and amplification processing on the audio signals. Signal processing circuit 101 is, for example, a digital signal processor (DSP). Signal processing circuit 101 can analyze the sound characteristics of the digital audio signals. Signal processing circuit 101 reads, by control from microcomputer 108, correction parameters for various types of audio signal processing from memory 102, and performs the audio signal processing on the digital audio signals based on the correction parameters read. For example, signal processing circuit 101 may read, from memory 102, a correction parameter for the adjustment processing on the sound characteristics of the digital audio signals to perform the adjustment processing based on the correction parameter. Signal processing circuit 101 may perform, with a set gain, the amplification processing on the digital audio signals which are input. This gain is a gain for amplifying the digital audio signals, and is set by microcomputer 108. The amplification processing performed by signal processing circuit 101 is an example of first amplification processing. The gain used in the amplification processing performed by signal processing circuit 101 is an example of a first gain. The gain used in the amplification processing performed by signal processing circuit 101 is different from the gain used in the amplification processing performed by phono equalizer 103. Signal processing circuit 101 outputs, to D/A converter 105, the digital audio signals on which the audio signal processing has been performed.

D/A converter 105 is a converter that converts, into analog audio signals, the digital audio signals whose sound characteristics have been adjusted by signal processing circuit 101. D/A converter 105 outputs, to amplifier 106, the analog audio signals after the conversion.

Amplifier 106 is an amplifier which amplifies the analog audio signals received from D/A converter 105. Amplifier 106 may be, for example, a class D amplifier or may be an amplifier of another class. The analog audio signals amplified by amplifier 106 are output to speakers 107 via speaker cables 31 and 32 connected to audio signal processing device 100.

Memory 102 is formed with a random access memory (RAM), a flash read only memory (ROM) or the like, and stores various types of information. Specifically, memory 102 stores programs which are executed by microcomputer 108. Memory 102 also stores correction parameters for the audio signal processing on the audio signals. Memory 102 also stores characteristic information indicating the characteristics of audio signals for measurement. Memory 102 also stores setting information indicating settings on the audio signal processing in audio signal processing device 100.

Microcomputer 108 is a controller which exchanges control signals between signal processing circuit 101, memory 102, phono equalizer 103, display device 109, input IF 110, selector 111, and communication IF 113. Microcomputer 108 executes the programs stored in memory 102 to perform various types of processing, and thereby controls the operations of signal processing circuit 101, memory 102, phono equalizer 103, display device 109, selector 111, and communication IF 113. Microcomputer 108 may perform the various types of processing according to input signals (operation signals) received by input IF 110 or input signals (operation signals) received from remote controller 120 by communication IF 113.

Microcomputer 108 stores, in memory 102, the setting information indicating the settings on the audio signal processing in audio signal processing device 100. Examples of the setting information stored in memory 102 include: gains which are set for the amplification processing performed by signal processing circuit 101 on the digital audio signals; selector information indicating an input terminal selected by selector 111; and cartridge information indicating the type of cartridge 12 in record player 10 which is connected. The cartridge information may be, for example, an identifier indicated by an input received by input IF 110 or communication IF 113 described later. Specifically, this input may be an input obtained by receiving, with input IF 110, an operation performed by the user on input IF 110 or may be an input obtained by receiving, with communication IF 113, an operation signal (input signal) transmitted from remote controller 120 through an operation performed by the user on remote controller 120. The identifier is, for example, an identifier which indicates the MM type, the MC type or the like. Microcomputer 108 identifies the type of cartridge according to the identifier specified by the input received with input IF 110 or communication IF 113, and stores, as the cartridge information, in memory 102, the identifier indicating the type of cartridge which is identified. Alternatively, microcomputer 108 may store, as the cartridge information, in memory 102, the identifier specified by the input received with input IF 110 or communication IF 113. Microcomputer 108 sets the gain for the amplification processing performed by phono equalizer 103 on the analog audio signals according to the type of cartridge indicated by the identifier serving as the cartridge information stored in memory 102. In other words, the gain set by microcomputer 108 for the amplification processing performed by phono equalizer 103 differs according to the type of cartridge indicated by the identifier serving as the cartridge information. Phono equalizer 103 uses the set gain to perform the amplification processing, and thereby can appropriately perform the amplification processing according to the type of cartridge 12.

Microcomputer 108 and signal processing circuit 101 may be formed as one processing circuit such as one large scale integration (LSI) circuit or one system on a chip (SoC). When microcomputer 108 and signal processing circuit 101 are realized by one SoC, the one SoC may include another constituent element of audio signal processing device 100.

Display device 109 is a device which displays information required by the user such as setting items for audio signal processing device 100 or content being reproduced. Display device 109 is formed with a liquid crystal display, an organic electro luminescence (EL) display, a fluorescent display (FL) tube or the like. Display device 109 is an example of a presenter.

Input IF 110 is an interface for operating audio signal processing device 100 by the user, and receives an operation from the user. Input IF 110 may be, for example, various types of switches for receiving an operation from the user. Input IF 110 may be a touch panel which is formed integrally with display device 109 and receives a touch operation from the user.

Communication IF 113 is an interface for communicating with an external device. Communication IF 113 may be, for example, a receiver which receives an operation signal (input signal) transmitted from remote controller 120 by an operation performed by the user. Communication IF 113 may be a wireless communicator which communicates with a portable terminal such as a smartphone or a tablet terminal. Communication IF 113 is not limited to wireless communication, and may be an interface for performing wired communication.

Input IF 110 and communication IF 113 are examples of a receiver which receives an input from the user.

Speakers 107 output sound based on the analog audio signals output from audio signal processing device 100.

[1-2. Operation]

The operation of audio signal processing device 100 will then be described.

[1-2-1. Generation of Correction Parameter and Storage of Sound Setting]

FIG. 3 is a flowchart showing the operation of measurement processing performed by the audio signal processing device in the embodiment.

The user first sets, on turntable 11 in record player 10, a test record for calculating a correction parameter (record for characteristic analysis). On the test record, the type of cartridge 12 in record player 10, the types of transmission cables 21 and 22, and test signals for measuring the sound characteristics of the audio signals which have been affected by the gain and the like for the amplification processing performed by signal processing circuit 101 are recorded. In other words, the test record is a phonograph record for measurement which is used for measuring changes in the sound characteristics produced in the audio signals for measurement. The changes in the sound characteristics to be measured are changes which are produced for a time after the audio signals for measurement are read by cartridge 12 in record player 10 until the audio signals for measurement reach signal processing circuit 101 in audio signal processing device 100. The audio signals for measurement have characteristics indicated by the characteristic information which is previously stored in memory 102.

Then, the user operates record player 10 to cause record player 10 to reproduce the test record.

Then, the user operates input IF 110 or remote controller 120 to instruct audio signal processing device 100 to measure the sound characteristics when the test record is reproduced by record player 10. In this way, audio signal processing device 100 receives, via input IF 110 or communication IF 113, an operation signal indicating an operation from the user (S11).

Microcomputer 108 controls signal processing circuit 101 according to the received operation signal, and measures the sound characteristics of the audio signals of the test record received from record player 10 by input terminal 112 (S12). Timing at which the performance of step S12 is started may be before timing at which the reproduction of the test record is started by record player 10, and the sound characteristics are preferably measured while record player 10 produces the test record.

Then, microcomputer 108 analyzes, based on a result of comparison between the measured sound characteristics (measurement result) and the characteristic information stored in memory 102, changes in the sound characteristics produced by receiving influences from the entire route from cartridge 12 in record player 10 to DSP 101. In other words, microcomputer 108 calculates differences between the measured sound characteristics and the characteristic information. Then, microcomputer 108 generates, based on the calculated differences, as the correction parameter used for the audio signal processing, a correction parameter for performing correction such that the characteristics of the audio signals which are input approach the characteristics indicated by the characteristic information (S13). The audio signal processing using the correction parameter is performed on the audio signals input to signal processing circuit 101, and thus the influences received from the entire route from cartridge 12 in record player 10 to DSP 101 can be reduced, with the result that the sound recorded on phonograph record 15 can be faithfully reproduced. The audio signal processing using the correction parameter is also said to include calibration processing for faithfully reproducing the sound recorded on the phonograph record by audio signal processing device 100.

Microcomputer 108 stores, in memory 102, the setting information and the correction parameter generated in step S13, in association with each other, the setting information indicating the settings on the audio signal processing in audio signal processing device 100 when the measurement is performed in step S12 (S14). The setting information stored in memory 102 in association with the correction parameter here includes, when the measurement is performed, at least one of the gain set for the amplification processing performed by signal processing circuit 101 on the digital audio signals, the selector information indicating the input terminal selected by selector 111, and the cartridge information indicating the type of cartridge 12 in record player 10 which is connected. In the present embodiment, a set of the correction parameter and the setting information stored in memory 102 is referred to as the sound setting. As shown in FIG. 4, audio signal processing device 100 may store, in memory 102, a plurality of sound settings, that is, a plurality of sets on assumption that the correction parameter and the setting information are one set. When a plurality of sound settings are stored in memory 102, setting identifiers for identifying a plurality of sound settings are provided. The setting identifier may be the name of a sound setting input by the user or an index number. Only one sound setting may be stored in memory 102.

[1-2-2. Reading Out of Sound Setting]

Figure 5:
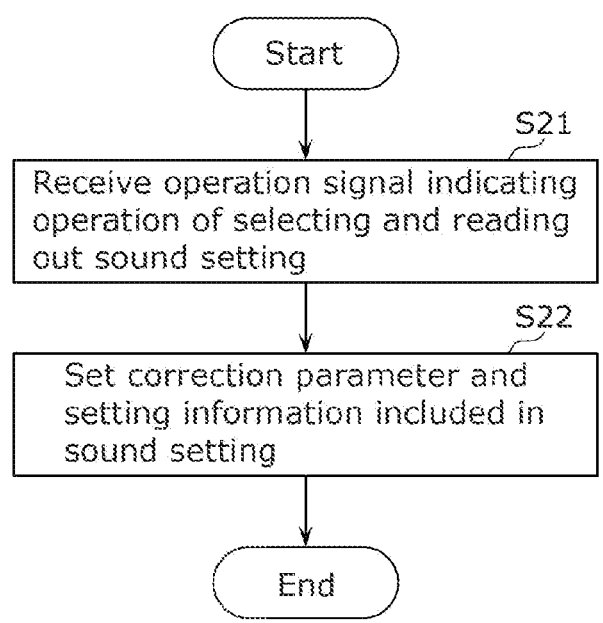
FIG. 5 is a flowchart showing the operation of sound setting application processing performed by the audio signal processing device in the embodiment.

FIG. 5 is a flowchart showing the operation of sound setting application processing performed by the audio signal processing device in the embodiment.

The user operates input IF 110 or remote controller 120 to perform an operation of selecting and reading out the sound setting for audio signal processing device 100 stored in memory 102. In this way, audio signal processing device 100 receives, via input IF 110 or communication IF 113, an operation signal indicating the operation of selecting and reading out the sound setting performed by the user (S21).

Microcomputer 108 selects, according to the received operation signal indicating the selection and reading out of the sound setting, one sound setting from one or more sound settings stored in memory 102, and sets a correction parameter included in the selected sound setting for audio signal processing device 100 and also sets the units of audio signal processing device 100 according to the setting information (S22). In other words, microcomputer 108 reads a correction parameter stored in memory 102 and the setting information stored in memory 102 in association with the correction parameter, and sets the units of audio signal processing device 100 according to the setting information read and also sets the correction parameter read for signal processing circuit 101. In this way, when audio signal processing device 100 thereafter receives the audio signals from record player 10, microcomputer 108 controls audio signal processing device 100 with the settings indicated by the setting information read to cause signal processing circuit 101 to perform the audio signal processing using the correction parameter read.

Specifically, microcomputer 108 reads one sound setting specified by the operation signal from one or more sound settings stored in memory 102. Microcomputer 108 sets the correction parameter included in the sound setting read for signal processing circuit 101. In this way, when audio signal processing device 100 thereafter receives the audio signals from record player 10, signal processing circuit 101 uses the correction parameter set to perform the adjustment processing on the sound characteristics of the digital audio signals which are input. Microcomputer 108 reflects the setting information included the sound setting read on signal processing circuit 101, phono equalizer 103, and selector 111 in audio signal processing device 100.

Specifically, microcomputer 108 sets the gain included in the setting information read for signal processing circuit 101. In this way, when audio signal processing device 100 thereafter receives the audio signals from record player 10, signal processing circuit 101 performs the amplification processing on the digital audio signals with the gain included in the setting information.

Microcomputer 108 sets, according to the type indicated by the cartridge information included in the setting information read, the gain for the amplification processing performed by phono equalizer 103 on the analog audio signals. In this way, when audio signal processing device 100 thereafter receives the audio signals from record player 10, phono equalizer 103 is caused to perform the amplification processing with the gain corresponding to the type indicated by the cartridge information included in the setting information.

Microcomputer 108 causes selector 111 to select one input terminal indicated by the selector information included in the setting information read. Specifically, when the one input terminal indicated by the selector information included in the setting information read is first input terminal 112a, microcomputer 108 causes selector 111 to select first input terminal 112a. When the one input terminal indicated by the selector information included in the setting information read is second input terminal 112b, microcomputer 108 causes selector 111 to select second input terminal 112b. Hence, when audio signal processing device 100 thereafter receives the audio signals from record player 10, signal processing circuit 101 performs, on the audio signals received using the one input terminal selected by selector 111, the audio signal processing using the correction parameter read together with the setting information.

In this way, the user performs the operation of reading out the sound setting stored in memory 102 when audio signal processing device 100 performs the measurement processing, and thereby can apply the correction parameter to the digital audio signals in signal processing circuit 101 and cause audio signal processing device 100 to easily reproduce the settings on the audio signal processing in audio signal processing device 100.

When the sound setting stored in memory 102 is applied to audio signal processing device 100, microcomputer 108 may compare the gain for the amplification processing in signal processing circuit 101 and the cartridge information for cartridge 12 which are set at that time with the gain for the amplification processing in signal processing circuit 101 and the cartridge information for cartridge 12 which are included in the sound setting to be applied. Then, as a result of the comparison, when these pieces of setting information are different from each other, microcomputer 108 sets the setting information read from memory 102, and when these pieces of setting information are the same as each other, microcomputer 108 does not need to change the setting information set at that time.

Microcomputer 108 may perform control to display, on display device 109, a message indicating that all the items of the setting information set in step S22 have been set. All the items of the setting information are information corresponding to three items of the gain set for the processing for amplifying the digital audio signals performed by signal processing circuit 101, the selector information indicating the input terminal selected by selector 111, and the cartridge information indicating the type of cartridge 12 in record player 10 which is connected. Microcomputer 108 may perform control to display, on display device 109, a message indicating that only the item whose setting is changed in step S22 has been set. When the one input terminal indicated by the selector information included in the setting information read is different from the current input terminal selected by selector 111, microcomputer 108 may display, on display device 109, a message indicating that the input terminal different from the one input terminal indicated by the selector information is selected by selector 111, and may cause selector 111 to perform switching of the input terminals.

Audio signal processing device 100 of the present embodiment can store a plurality of sound settings. Hence, for example, when the user replaces cartridge 12 in record player 10 with another type of cartridge or when the user replaces record player 10, the configuration of the record reproduction system differs before and after the replacement. For example, the number of combinations of N (N is a natural number) types of cartridges and M (M is a natural number) types of record players is N×M, and thus (N×M) configurations of the record reproduction system can be provided. Hence, appropriate (N×M) sound settings are respectively needed for the (N×M) configurations of the record reproduction system, and thus audio signal processing device 100 of the present embodiment can store the (N×M) sound settings in memory 102. Therefore, the user can select and read out the sound setting corresponding to the type of cartridge 12 and the type of record player 10.

Audio signal processing device 100 may have the function of being able to turn off the sound setting which is stored. Microcomputer 108 may be configured such that, when the sound setting is turned off, the stored sound setting is not applied. Here, microcomputer 108 may be configured such that one of the correction parameter and the setting information in the sound setting stored in memory 102 is not applied or may be configured such that both of them are not applied.

Even when the sound setting stored in memory 102 is applied to audio signal processing device 100, audio signal processing device 100 may receive a change in the setting information. When a change in the setting information is received, the correction parameter being used is not appropriate to the setting information after the change. Hence, when a change in the setting of any one of the items included in the setting information is received, microcomputer 108 may perform control to turn off the application of the correction parameter for the audio signal processing in signal processing circuit 101. Here, microcomputer 108 may perform control to display, on display device 109, a message for notifying the user that the correction parameter is turned off or may control communication IF 113 to notify the message to a portable terminal of the user which is previously registered.

When the user operates input IF 110 or remote controller 120 to switch the setting of selector 111 (input terminal), the sound setting may be switched according to the setting of selector 111 (input terminal) selected by the user. Specifically, when an input indicating the setting of selector 111 is acquired from input IF 110 or communication IF 113, microcomputer 108 searches for a sound setting including the same setting as the setting of selector 111 which is input among a plurality of sound settings stored in memory 102. In other words, when a change in the setting of selector 111 (input terminal) is received, microcomputer 108 searches memory 102 for a sound setting including the selector information indicating the same input terminal as the changed input terminal. When one applicable sound setting is found in step S22, microcomputer 108 sets the sound setting for audio signal processing device 100. When a plurality of applicable sound settings are found, microcomputer 108 may inquire of the user which one of the sound settings found is selected so as to cause the user to make a selection using input IF 110 or remote controller 120.

[1-3. Effects and Like]

As described above, in the present embodiment, audio signal processing device 100 is audio signal processing device 100 that performs the audio signal processing on the audio signals reproduced in record player 10, and includes first input terminal 112a, memory 102, signal processing circuit 101, and microcomputer 108. First input terminal 112a receives the audio signals from record player 10. Memory 102 stores the correction parameter for the audio signal processing on the audio signals and the characteristic information indicating the characteristic of the audio signals for measurement. Signal processing circuit 101 performs, based on the correction parameter stored in memory 102, the audio signal processing on the audio signals received from first input terminal 112a. Microcomputer 108 measures, when audio signals for measurement recorded on a phonograph record for measurement are reproduced by record player 10, the sound characteristic of the audio signals received by first input terminal 112a from record player 10.

Microcomputer 108 generates, based on a result of comparison between the result of the measurement and the characteristic information stored in memory 102, the correction parameter for the audio signal processing performed in signal processing circuit 101. Microcomputer 108 stores, in memory 102, setting information and the correction parameter generated, in association with each other, the setting information indicating a setting on the audio signal processing in audio signal processing device 100 when the measurement is performed.

In audio signal processing device 100 according to the present embodiment, microcomputer 108 reads the correction parameter stored in memory 102 and the setting information stored in memory 102 in association with the correction parameter, controls audio signal processing device 100 with the setting indicated by the setting information read, and causes signal processing circuit 101 to perform the audio signal processing using the correction parameter read.

In this way, audio signal processing device 100 according to the present embodiment stores, in memory 102, the setting information and the correction parameter generated, in association with each other, the setting information indicating the setting on the audio signal processing in audio signal processing device 100 when the measurement is performed. Hence, for example, when the user operates audio signal processing device 100 to select and set the correction parameter and the setting information stored in memory 102 in association with each other, the user can also automatically make the setting for audio signal processing device 100 based on the setting information in conjunction with the setting for the correction parameter. Therefore, it is possible to perform, without impairing the convenience of the user, the audio signal processing using the correction parameter obtained by performing the measurement with the setting desired by the user, with the result that desired sound quality can easily be realized.

Audio signal processing device 100 according the present embodiment further includes second input terminal 112b and selector 111. Second input terminal 112b receives an input of the audio signals from record player 10. Selector 111 selects, from first input terminal 112a and second input terminal 112b, one input terminal for receiving the audio signals. The setting information includes the selector information indicating the one input terminal selected by selector 111 when the measurement is performed. Microcomputer 108 causes selector 111 to select the one input terminal indicated by the selector information included in the setting information read. Signal processing circuit 101 performs, on the audio signals received by the one input terminal selected by selector 111, the audio signal processing using the correction parameter read together with the setting information.

Hence, when the input terminal selected by selector 111 is different from the input terminal indicated by the selector information included in the setting information read, the input terminal indicated by the selector information is caused to be selected by selector 111.

As described above, when the setting indicated by the setting information read is different from the current setting for audio signal processing device 100, the setting is changed to the setting indicated by the setting information, and thus it is possible to also automatically make the setting for audio signal processing device 100 based on the setting information in conjunction with the setting for the correction parameter. Therefore, the convenience of the user is enhanced.

In audio signal processing device 100 according to the present embodiment, the audio signal processing includes first amplification processing that is performed on digital audio signals after analog-digital conversion. The setting information includes a first gain set for the first amplification processing. Signal processing circuit 101 performs the first amplification processing with the first gain included in the setting information read.

Hence, when the first gain set for the first amplification processing performed by signal processing circuit 101 is different from the first gain included in the setting information read, the gain for the first amplification processing is updated to the first gain included in the setting information read. As described above, when the setting indicated by the setting information read is different from the current setting for audio signal processing device 100, the setting is changed to the setting indicated by the setting information, and thus it is possible to also automatically make the setting for audio signal processing device 100 based on the setting information in conjunction with the setting for the correction parameter. Therefore, the convenience of the user is enhanced.

Audio signal processing device 100 according to the present embodiment further includes phono equalizer 103 and input IF 110 or communication IF 113. Phono equalizer 103 performs second amplification processing on the analog audio signals received by first input terminal 112a or second input terminal 112b. Input IF 110 or communication IF 113 receives an input from the user. The setting information includes the cartridge information indicated by the input received by input IF 110 or communication IF 113 and indicating the type of cartridge 12 included in record player 10. Microcomputer 108 causes phono equalizer 103 to perform the second amplification processing with a second gain corresponding to the type of cartridge 12 indicated by the cartridge information included in the setting information read.

Hence, when the type of cartridge set for audio signal processing device 100 is different from the type of cartridge indicated by the cartridge information included in the setting information read, the setting for audio signal processing device 100 is updated to the type of cartridge indicated by the cartridge information. In this way, microcomputer 108 updates, according to the updated setting, the second gain for the second amplification processing performed by phono equalizer 103. As described above, when the setting indicated by the setting information read is different from the current setting for audio signal processing device 100, the setting is changed to the setting indicated by the setting information, and thus it is possible to also automatically make the setting for audio signal processing device 100 based on the setting information in conjunction with the setting for the correction parameter. Therefore, the convenience of the user is enhanced.

Audio signal processing device 100 according to the present embodiment further includes display device 109 that displays a message. When the one input terminal indicated by the selector information included in the setting information read is different from the input terminal selected by selector 111, microcomputer 108 displays, on display device 109, a message indicating that the input terminal different from the one input terminal is selected by selector 111. Hence, it is possible to provide a notification to the user that the input terminal different from the one input terminal is selected by selector 111.

Other Embodiments

The embodiment has been described above as an example of techniques disclosed in the present application. However, the techniques disclosed in the present disclosure are not limited to the embodiment, and can be applied to embodiments obtained by performing changes, replacements, additions, omissions, and the like. Embodiments can be newly provided by combining the constituent elements described in Embodiment 1 above.

For example, although in the above embodiment, each of signal processing circuit 101 and microcomputer 108 has its own roles, a part or the whole of the processing to be performed by signal processing circuit 101 may be performed by microcomputer 108 or a part or the whole of the processing to be performed by microcomputer 108 may be performed by signal processing circuit 101.

For example, although in the above embodiment, the example is described where the test record is used for the analysis of the sound characteristics, the present disclosure is not limited to this example. For example, the test signals may be input from a portable terminal device different from record player 10. In other words, the portable terminal device inputs the test signals to input terminal 112 in audio signal processing device 100.

For example, although in the above embodiment, the example is described where, as the setting items automatically set when the correction parameter is applied, the gain for signal processing circuit 101, the type of cartridge 12, and the input terminal selected by selector 111 are mentioned as examples, settings other than those described above may be used as long as they are settings on sound characteristics.

For example, although in the above embodiment, the example is described where signal processing circuit 101 performs the amplification with the gain set for the digital audio signals, the present disclosure is not limited to this example. For example, the amplification processing may be performed by another constituent element such as phono equalizer 103. In such a case, microcomputer 108 sets a gain for the constituent element described above, and the constituent element performs the amplification processing with the set gain.

For example, although in the above embodiment, the example is described where microcomputer 108 corrects, based on the information of the type of cartridge 12 which is set, the gain for the amplification processing in phono equalizer 103, the present disclosure is not limited to this example. Microcomputer 108 may correct or set, based on the information of the type of cartridge 12, a parameter for another constituent element of audio signal processing device 100. For example, microcomputer 108 may correct, based on the information of the type of cartridge 12, the gain for the amplification processing on the digital audio signals in signal processing circuit 101 and the parameter for the audio signal processing in signal processing circuit 101. As described above, microcomputer 108 corrects or sets parameters for the units, and thus audio signal processing device 100 can appropriately perform processing on the audio signals according to the type of cartridge 12.

For example, in the above embodiment, when the one input terminal indicated by the selector information included in the setting information read is different from the current input terminal selected by selector 111, microcomputer 108 displays, on display device 109, the message indicating that the input terminal different from the one input terminal indicated by the selector information is selected by selector 111, and then causes selector 111 to perform switching of the input terminals. However, the present disclosure is not limited to this configuration. In this case, it is not necessary to cause selector 111 to perform switching of the input terminals. Moreover, this message may further include a message for prompting the user to provide, from input IF 110 or remote controller 120, an input for switching the setting of selector 111 to the one input terminal indicated by the selector information. Hence, it is possible to notify the user that the input terminal different from the one input terminal is selected by the selector. In this way, it is possible to avoid an event where as a result of selector 111 automatically switching input terminal 112, unintended input terminal 112 is selected to output unintended sound or input terminal 112 to which nothing is connected is selected such that sound is not output at all.

For example, although in the above embodiment, audio signal processing device 100 can store a plurality of correction parameters and can turn off the correction parameter, audio signal processing device 100 may be configured to be able to store only one correction parameter. Audio signal processing device 100 does not need to have the function of turning off the correction parameter.

For example, in the above embodiment, when the setting information in audio signal processing device 100 is changed by an operation performed by the user while the correction parameter is being applied, the message for providing a notification that the correction parameter is not appropriate to the setting after the change is displayed on display device 109, and the application of the correction parameter is turned off. However, the application of the correction parameter may be continued by displaying, on display device 109, a message for providing a notification that the setting cannot be changed.

For example, although in the above embodiment, microcomputer 108 displays a message on display device 109 when a notification is provided to the user, the present disclosure is not limited to this configuration. Microcomputer 108 may control communication IF 113 to notify the message to a portable terminal of the user which is previously registered. In other words, display device 109 and communication IF 113 are examples of the presenter which presents a message.

For example, in the above embodiment, the state of the application of the correction parameter is stored for each of the input terminals which can be selected by selector 111, and when switching is performed by selector 111, the correction parameter is automatically switched to the stored correction parameter. However, the switching does not need to be performed.

For example, in the above embodiment, FIG. 1 shows the configuration where an unbalanced signal (RCA) and a balanced signal (XLR) are output from record player 10 and one of them is selected by selector 111 in audio signal processing device 100. Although in the configuration, selector 111 makes a selection from two PHONO inputs, the configuration can be applied to many variations such as a variation where both RCA and XLR are connected from one record player 10 and a variation where RCA and XLR are respectively connected from two record players, and the connection method is not limited.

The above embodiments are intended to describe examples of the techniques disclosed in the present disclosure, and thus various changes, replacements, additions, omissions, and the like can be performed in the scope of claims or a scope equivalent thereto.

INDUSTRIAL APPLICABILITY

The present disclosure can be applied to an audio signal processing device which can perform audio signal processing corresponding to the characteristics of a record reproduction system and the like.

The invention claimed is:

1. An audio signal processing device that performs audio signal processing on an audio signal reproduced in a record player, the audio signal processing device comprising:
 a first input terminal that receives the audio signal from the record player;
 a memory that stores a correction parameter for the audio signal processing on the audio signal and characteristic information indicating a characteristic of an audio signal for measurement;
 a signal processing circuit that performs, based on the correction parameter stored in the memory, the audio signal processing on the audio signal received from the first input terminal; and
 a microcomputer that
  measures, when the audio signal for measurement recorded on a phonograph record for measurement is reproduced by the record player, a sound characteristic of an audio signal received by the first input terminal from the record player,
  generates, based on a result of comparison between a result of the measurement performed by the microcomputer and the characteristic information stored in the memory, the correction parameter for the audio signal processing in the signal processing circuit, and
  stores, in the memory, setting information and the correction parameter generated, in association with each other, the setting information indicating a setting on the audio signal processing in the audio signal processing device when the measurement is performed.

2. The audio signal processing device according to claim 1,
 wherein the microcomputer reads the correction parameter stored in the memory and the setting information stored in the memory in association with the correction parameter, controls the audio signal processing device with the setting indicated by the setting information read, and causes the signal processing circuit to perform the audio signal processing using the correction parameter read.

3. The audio signal processing device according to claim 2, further comprising:
 a second input terminal that receives an input of the audio signal from the record player; and
 a selector that selects, from the first input terminal and the second input terminal, one input terminal for receiving the audio signal,
 wherein the setting information includes selector information indicating the one input terminal selected by the selector when the measurement is performed,
 the microcomputer causes the selector to select the one input terminal indicated by the selector information included in the setting information read, and
 the signal processing circuit performs, on the audio signal received by the one input terminal selected by the selector, the audio signal processing using the correction parameter read together with the setting information.

4. The audio signal processing device according to claim 2, further comprising:
 a second input terminal that receives an input of the audio signal from the record player;
 a selector that selects, from the first input terminal and the second input terminal, one input terminal for receiving the audio signal; and
 a presenter that presents a message,
 wherein the setting information includes selector information indicating the one input terminal selected by the selector when the measurement is performed, and
 the microcomputer causes, when the one input terminal indicated by the selector information included in the setting information read is different from an input terminal selected by the selector, the presenter to present a message indicating that an input terminal different from the one input terminal is selected by the selector.

5. The audio signal processing device according to claim 4,
 wherein the message includes a message that prompts a user to provide an input for causing the selector to switch to the one input terminal.

6. The audio signal processing device according to claim 2,
 wherein the audio signal processing includes first amplification processing that is performed on an audio signal after analog-digital conversion,
 the setting information includes a first gain that is set for the first amplification processing, and
 the signal processing circuit performs the first amplification processing with the first gain included in the setting information read.

7. The audio signal processing device according to claim 2, further comprising:
 an amplification processing circuit that performs second amplification processing on the audio signal received by the first input terminal; and
 a receiver that receives an input from a user,
 wherein the setting information includes cartridge information indicated by the input received by the receiver and indicating a type of cartridge included in the record player, and
 the microcomputer causes the amplification processing circuit to perform the second amplification processing with a second gain corresponding to the type of cartridge indicated by the cartridge information included in the setting information read.

8. An audio signal processing method performed in an audio signal processing device that performs audio signal processing on an audio signal reproduced in a record player, the audio signal processing method comprising:
 measuring, when an audio signal for measurement recorded on a phonograph record for measurement is reproduced by the record player, a sound characteristic of the audio signal received from the record player;
 generating, based on a result of comparison between a result of the measurement performed and characteristic information stored in a memory included in the audio signal processing device and indicating a characteristic of the audio signal for measurement, a correction parameter for the audio signal processing; and
 storing, in the memory, setting information and the correction parameter generated, in association with each other, the setting information indicating a setting on the audio signal processing in the audio signal processing device when the measurement is performed.

9. A non-transitory computer-readable recording medium having recorded thereon a program for causing a microcomputer to perform an audio signal processing method in an audio signal processing device that performs audio signal processing on an audio signal reproduced in a record player,
 wherein the audio signal processing method includes:
  measuring, when an audio signal for measurement recorded on a phonograph record for measurement is reproduced by the record player, a characteristic of the audio signal received from the record player;

generating, based on a result of comparison between a result of the measurement performed and characteristic information stored in a memory included in the audio signal processing device and indicating a characteristic of the audio signal for measurement, a correction parameter for the audio signal processing; and storing, in the memory, setting information and the correction parameter generated, in association with each other, the setting information indicating a setting on the audio signal processing in the audio signal processing device when the measurement is performed.

* * * * *